United States Patent
Dong

(10) Patent No.: US 12,471,020 B2
(45) Date of Patent: Nov. 11, 2025

(54) DATA TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 435 days.

(21) Appl. No.: 17/921,096

(22) PCT Filed: Apr. 24, 2020

(86) PCT No.: PCT/CN2020/086829
§ 371 (c)(1),
(2) Date: Oct. 24, 2022

(87) PCT Pub. No.: WO2021/212511
PCT Pub. Date: Oct. 28, 2021

(65) Prior Publication Data
US 2023/0171691 A1    Jun. 1, 2023

(51) Int. Cl.
*H04W 52/02*    (2009.01)

(52) U.S. Cl.
CPC ... *H04W 52/0216* (2013.01); *H04W 52/0219* (2013.01)

(58) Field of Classification Search
CPC ......... H04W 52/0216; H04W 52/0219; H04W 52/0229; H04W 52/0235; H04W 52/02; H04W 88/06; Y02D 30/70
See application file for complete search history.

(56) References Cited

U.S. PATENT DOCUMENTS

| | | | |
|---|---|---|---|
| 2014/0334365 A1 | 11/2014 | Jafaran et al. | |
| 2019/0357143 A1 | 11/2019 | Wang et al. | |
| 2020/0178171 A1* | 6/2020 | Lou | H04W 76/28 |
| 2020/0280918 A1* | 9/2020 | Huang | H04W 80/02 |
| 2020/0322889 A1* | 10/2020 | Chitrakar | H04W 52/0235 |
| 2021/0051580 A1* | 2/2021 | Kim | H04W 74/00 |
| 2021/0144637 A1* | 5/2021 | Kwon | H04W 80/02 |

FOREIGN PATENT DOCUMENTS

| | | |
|---|---|---|
| CN | 105379364 A | 3/2016 |
| CN | 109906638 A | 6/2019 |
| WO | 2019139984 A1 | 7/2019 |
| WO | 2019160496 A1 | 8/2019 |

OTHER PUBLICATIONS

International Search Report in Application No. PCT/CN2020/086829 dated on Jan. 5, 2021 with English translation,(4p).
Nurchis, Maddalena et al.,"Target Wake Time: Scheduled Access in IEEE 802.11AX WLANS", IEEE Wireless Communications, Apr. 2019, (9p).

\* cited by examiner

*Primary Examiner* — Ricky Q Ngo
*Assistant Examiner* — Kabir U Jahangir
(74) *Attorney, Agent, or Firm* — Arch & Lake LLP; Hao Tan; Shen Wang

(57) ABSTRACT

A data transmission method includes: generating, by a terminal, a multi-link target wakeup time (TWT) data frame based on one link, the TWT data frame including a baseline TWT and a plurality of TWT offsets with respect to the baseline TWT; and sending, by the terminal, the TWT data frame.

18 Claims, 6 Drawing Sheets

S11
Generate a multi-link TWT data frame based on one link, the multi-link TWT data frame including a baseline TWT and a plurality of TWT offsets with respect to the baseline TWT S12
Send the multi-link TWT data frame

| Element identifier | Length field | Control field | Target wakeup time parameter information |
|---|---|---|---|

Octal system: 1     1     1     Variable

| B0 | B1 | B2 B3 | B4 | B5 | B6 B7 |
|---|---|---|---|---|---|
| NDP paging indicator | Responder PM mode | Negotiation type | Target wakeup information frame disabled | Wake duration unit | Reserved |

Bit: 1    1    2    1    1    2

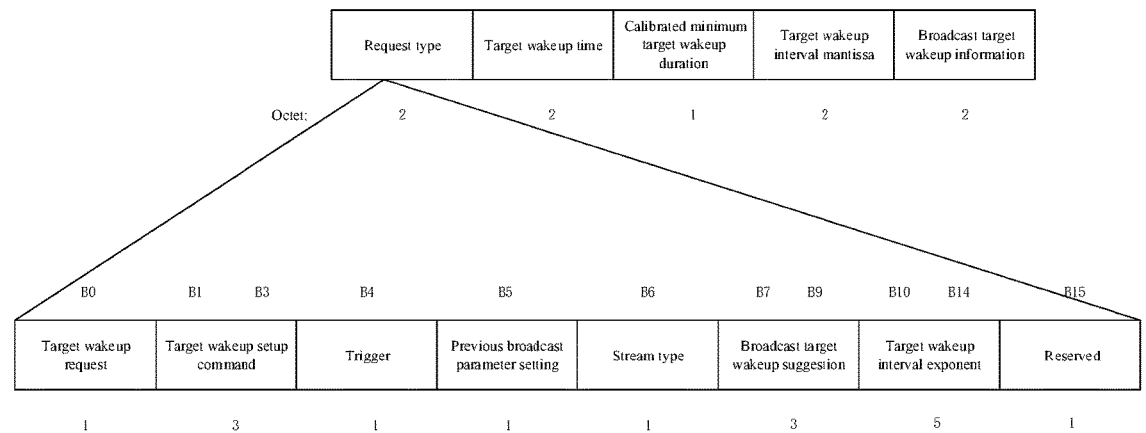
Fig. 2D
| Band identification 1 | First link identification | Target wakeup time offset | ....... | Band identification 2 | First link identification | ... | Band identification n | First link identification | ... |
Fig. 3
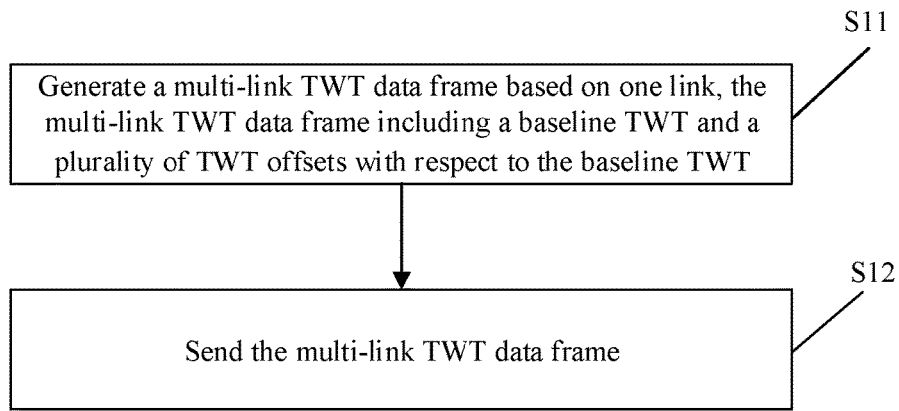
Fig. 4

DATA TRANSMISSION METHOD AND APPARATUS, AND STORAGE MEDIUM

CROSS REFERENCE TO RELATED APPLICATION

The present application is a U.S. National Stage Application of International Application No. PCT/CN2020/086829 filed on Apr. 24, 2020, the entire content of which is incorporated herein by reference for all purposes.

BACKGROUND

In order to improve the access rate and throughput of wireless local area network (WLAN) technologies such as wireless fidelity (Wi-Fi), the Institute of Electrical and Electronics Engineers (IEEE) 802.11 has established a study group (SG) to study the next generation mainstream (802.11a/b/g/n/ac/ax) Wi-Fi technology.

The research scope of the next generation Wi-Fi technology includes 320 MHz bandwidth transmission, multi-band aggregation and collaboration, etc. and the proposed vision is to improve the rate and throughput by at least four times compared with existing 802.11ax. Multi-band aggregation and collaboration refers to the simultaneous communication between devices in multiple bands of 2.4 GHZ, 5.8 GHz and 6-7 GHz or multiple bandwidths in one band, i.e., multi-link communication. For multi-link communication between the devices, a new media access control (MAC) mechanism needs to be defined for management. Another vision of IEEE802.11be is to support low delay transmission.

SUMMARY

The disclosure relates to the technical field of communication, in particular to a data transmission method and apparatus, and a storage medium.

According to a first aspect of an example of the disclosure, a data transmission method is provided, including:
  generating, by a terminal, a multi-link target wakeup time (TWT) data frame based on one link, the multi-link TWT data frame including a baseline TWT and a plurality of TWT offsets with respect to the baseline TWT; and sending, by the terminal, the multi-link TWT data frame.

According to a second aspect of the example of the disclosure, a data transmission method is provided, including:
  receiving, by a terminal, a multi-link target wakeup time (TWT) data frame, the multi-link TWT data frame being generated based on one link and including a baseline TWT and a plurality of TWT offsets with respect to the baseline TWT; and receiving, by the terminal, data based on the baseline TWT and the plurality of TWT offsets.

According to a third aspect of the example of the disclosure, a data transmission apparatus is provided, including:
  a processor; and a memory, configured to store processor-executable instructions.

The processor is configured to: generate a multi-link target wakeup time (TWT) data frame based on one link, the multi-link TWT data frame comprising a baseline TWT and a plurality of TWT offsets with respect to the baseline TWT; and send the multi-link TWT data frame.

According to a fourth aspect of the example of the disclosure, a data transmission apparatus is provided, including:
  a processor; and a memory, configured to store processor-executable instructions.

The processor is configured to: execute the data transmission method described in the second aspect.

It needs to be understood that the above general descriptions and later detailed descriptions are explanatory and illustrative, and cannot limit the disclosure.

BRIEF DESCRIPTION OF THE DRAWINGS

The accompanying drawings here are incorporated into the specification and constitute a part of the specification, show examples consistent with the disclosure, and together with the specification are used to explain the principle of the disclosure.

FIG. 1 is a schematic diagram of a WLAN communication system illustrated according to an example.

FIG. 2A to FIG. 2D are schematic diagrams of a single-link TWT format illustrated according to an example.

FIG. 3 is a schematic diagram of a multi-link TWT format illustrated according to an example.

FIG. 4 is a flow diagram of a data transmission method illustrated according to an example.

DETAILED DESCRIPTION

Examples will be described in detail here, and instances of the examples are shown in the accompanying drawings. When the following description refers to the accompanying drawings, unless otherwise indicated, the same numbers in different drawings indicate the same or similar elements. The implementations described in the following examples do not represent all implementations consistent with the disclosure. Rather, they are instances of apparatuses and methods consistent with some aspects of the disclosure as detailed in the appended claims.

In IEEE802.11ax, a target wakeup time (TWT) mechanism is introduced to save power and reduce power consumption of devices. However, the target wakeup time mechanism merely supports single-link operations and cannot be compatible with multi-link operations.

The disclosure provides a data transmission method and apparatus, and a storage medium.

Figures 1, 2A, 2B:
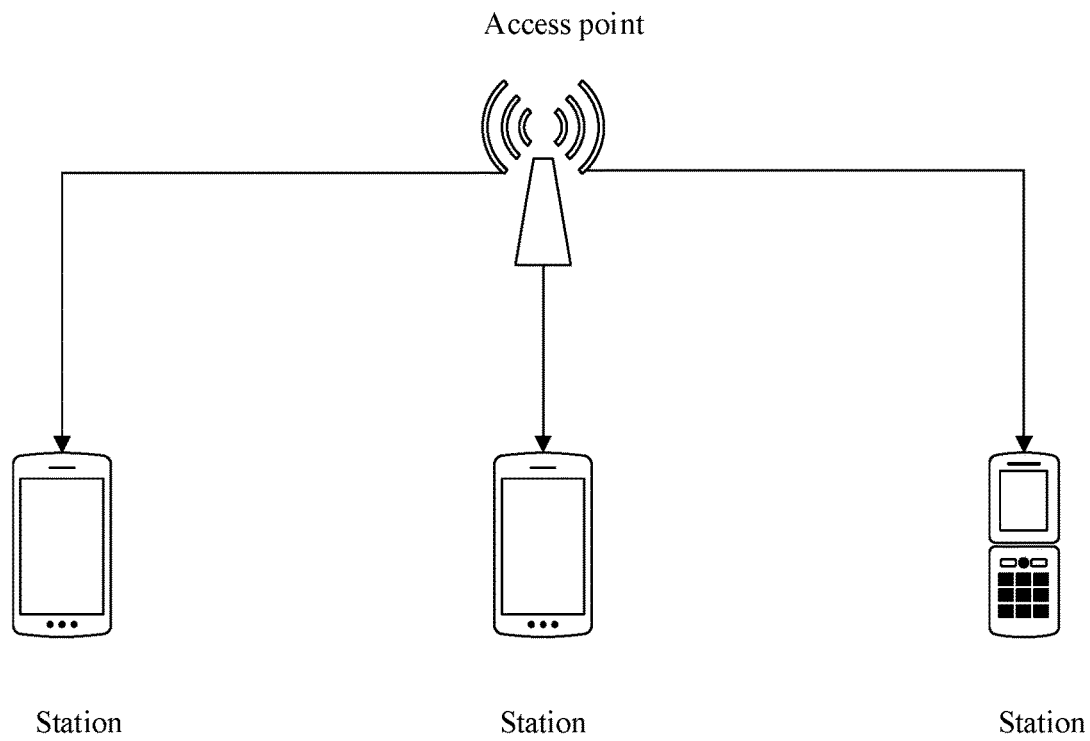

A communication resource allocation method provided by the disclosure is applied to a WLAN communication system. FIG. 1 illustrates a schematic diagram of a WLAN communication system applicable to an example of the disclosure. As shown in FIG. 1, one or more stations (STA) in the WLAN communication system transmit through communication resources allocated by an access point (AP) and initiate a flow associated with the AP.

The station involved in the disclosure may be understood as a terminal in a wireless local area network. The terminal may be called user equipment (UE), a mobile station (MS), a mobile terminal (MT), etc., and is a device that provides voice and/or data connectivity to users. For example, the terminal may be a handheld device, a vehicle-mounted device, etc. with a wireless connection function. At present, instances of some terminals are as follows: a mobile phone, a pocket personal computer (PPC), a palmtop, a personal digital assistant (PDA), a laptop, a tablet, a wearable device, an Internet of Things (IoT) client or a vehicle-mounted device. In the disclosure, the AP refers to a device, a router, etc. for a wireless local area network terminal to access the network.

In the related art, the WLAN communication system adopts the IEEE802.11 standard for data transmission. IEEE802.11 established an SG to research the next generation mainstream (802.11a/b/g/n/ac/ax) Wi-Fi technology. The research scope of the next generation mainstream (802.11a/b/g/n/ac/ax) Wi-Fi technology is multi-band aggregation and collaboration, namely the simultaneous communication in multiple bands of 2.4 GHZ, 5.8 GHz and 6-7 GHz or multiple bandwidths in one band, i.e., multi-link communication. For the multi-link communication between devices, it is still needed to save more power and reduce power consumption of the devices.

In IEEE802.11ax, a TWT mechanism is introduced to save more power for the devices. The TWT mechanism in relevant standards includes unicast and broadcast transmission modes, and for backward compatibility, IEEE802.11be also supports the TWT mechanism. However, the current TWT mechanism merely supports single-link operations, while IEEE802.11be supports multi-link operations. Thus, the TWT mechanism needs to be enhanced to achieve settings of a TWT for the multi-link, so that the TWT mechanism is applied to the multi-link, and a device is more power-saving.

An example of the disclosure provides a TWT data frame applicable to the settings of the TWT for the multi-link, which is referred to as a multi-link TWT data frame. The multi-link TWT data frame includes a baseline TWT and a plurality of TWT offsets (time offsets) with respect to the baseline TWT. Based on the baseline TWT and the plurality of TWT offsets, the TWT for the multi-link may be determined, and then settings of the TWT for the multi-link are implemented, so that the TWT mechanism is applied to the multi-link, and a device is more power-saving.

In an implementation, due to operations based on the multi-link, if a TWT is negotiated based on each link, a plurality of pieces of signaling will be produced. Thus, in order to avoid this phenomenon in an example of the disclosure, the multi-link TWT data frame is generated based on one link, and the TWT for the multi-link is negotiated through the multi-link TWT data frame generated based on the one link.

In the example of the disclosure, the baseline TWT included in the multi-link TWT data frame may be a TWT of one link in a plurality of links. For example, the link may be a link generating the multi-link TWT data frame. In the disclosure, for the ease of description, the link for generating the baseline TWT is called a first link, and the first link is one link in the plurality of links. The first link may be a link generating the multi-link TWT data frame.

Figure 2C:
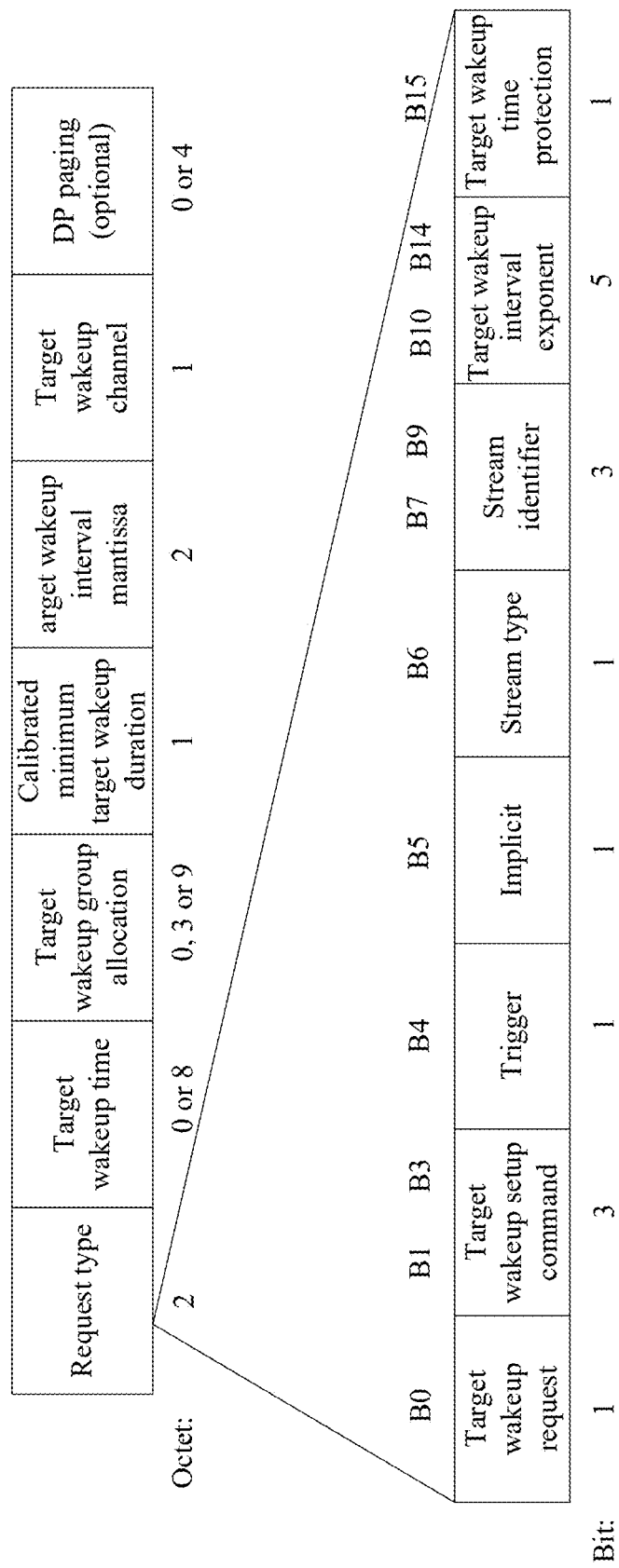

The first link in the example of the disclosure may be understood as a single link. A TWT based on a single link is referred to as a single-link TWT in the disclosure. The format of the single-link TWT is as shown in FIG. 2A. In FIG. 2A, the single-link TWT format includes an element identifier (element ID) field, a length field, a control field and TWT parameter information. The element ID field, the length field and the control field respectively account for one octet. Further, the format of the control field is as shown in FIG. 2B. In FIG. 2B, the control field includes a null data packet (NDP) paging indicator, a responder power management (PM) mode, a negotiation Type, TWT information frame disabled, a wake duration unit, and reserved. The format of TWT parameter information is as shown in FIGS. 2C and 2D. FIG. 2C is the format of TWT parameter information for unicast operation communication. Referring to FIG. 2C, the format of the TWT parameter information for unicast operation communication includes a request type, a target wakeup time, target wakeup group allocation, a calibrated minimum target wakeup duration, a target wakeup interval mantissa, a target wakeup channel and NDP paging (optional). A unicast operation request type field includes a target wakeup request, a target wakeup setup command, a trigger frame, implicit, a stream type, a stream identifier, a target wakeup interval exponent, and a target wakeup time protection field. FIG. 2D is a format of TWT parameter information for broadcast operation communication. Referring to FIG. 2D, the format of the TWT parameter information for broadcast operation communication includes a request type, a target wakeup time, a calibrated minimum target wakeup duration, a target wakeup interval mantissa, and broadcast target wakeup information. A broadcast operation request type field includes a target wakeup request, a target wakeup setup command, a trigger frame, previous broadcast parameter settings, a stream type, a broadcast target wakeup time suggestion, a target wakeup interval exponent, and reserved.

As shown in FIGS. 2A to 2D, it can be seen that the TWT in a link with a non-initial association needs to be determined based on the target wakeup interval exponent and the like, and a determination process is relatively complex, so that, in order to simplify the process of determining the baseline TWT in the example of the disclosure, a link in which a station and an access point establish an initial association is taken as a first link.

The TWT of the first link in the example of the disclosure may be determined based on parameter information of a time synchronization function (TSF) of the first link. The parameter information of the TSF of the first link may be obtained based on a beacon frame of the first link.

In the example of the disclosure, in order to identify the first link for determining the baseline TWT, a link identification may be included in a TWT data frame, and the first link for determining the baseline TWT is represented through the link identification. The link identification is, for example, a first link identification shown in FIG. 3.

In the example of the disclosure, a plurality of TWT offsets are TWTs used for determining other links than the link for determining the baseline TWT in a multi-link operation. The multi-link operation may be understood as multi-band aggregation, so the plurality of TWT offsets may correspond to a plurality of bands. In order to establish a corresponding relationship between the bands and the TWT offsets, the multi-link TWT data frame may include a plurality of band identifications, and each of the plurality of band identifications corresponds to a TWT offset of the TWT offsets, respectively.

FIG. 3 illustrates a schematic diagram of a multi-link TWT data frame format illustrated according to an example of the disclosure. As shown in FIG. 3, the multi-link TWT data frame format includes a plurality of band identifications (Band IDs) and a plurality of TWT offsets. For example, the Band IDs include n Band IDs, namely Band ID 1, Band ID 2 . . . . Band ID n respectively. Band ID 1 corresponds to one TWT offset (Timeoffset). Further, the multi-link TWT data frame format in FIG. 3 includes a link identification for identifying a first link, such as the first link identification.

Further, in the example of the disclosure, in order to distinguish the multi-link TWT data frame, an identification bit is included in the multi-link TWT data frame, and the identification bit is configured for identifying that the multi-link TWT data frame is a TWT data frame for indicating performing a multi-link operation.

Based on the multi-link TWT data frame provided by the example of the disclosure, settings of a TWT for the multi-link may be implemented, so that a TWT mechanism is applied to the multi-link, and a device is more power-saving.

FIG. 4 is a flow diagram of a data transmission method illustrated according to an example. As shown in FIG. 4, the data transmission method is used in a device supporting multi-link transmission and includes the following steps.

In step S11, a multi-link TWT data frame is generated based on one link.

In the disclosure, the multi-link TWT data frame includes a baseline TWT and a plurality of TWT offsets with respect to the baseline TWT.

The multi-link TWT data frame generated in the example of the disclosure may be the multi-link TWT data frame involved in the above example, which will not be detailed here.

In an implementation, due to operations applied to multi-link, if a TWT is negotiated based on each link, a plurality of pieces of signaling will be produced. Thus, in order to avoid this phenomenon in the example of the disclosure, the multi-link TWT data frame is generated based on one link, and the TWT for the multi-link is negotiated through the multi-link TWT data frame generated based on the one link.

In an implementation, specifically, a link in which a station and an access point establish an initial association is used as the reference. Based on this link, parameter information of a time synchronization function (TSF) is obtained from a beacon frame, and TWT points of stations based on other links may be identified with time offset information, specifically in the format of link+timeoffset shown in FIG. 3.

In the example of the disclosure, the multi-link TWT data frame is generated in the link in which the station and the access point establish the initial association, and in order to identify that a multi-link TWT is generated in the link with the initial association and TWT negotiation is performed, an identification bit configured for identifying performing of a multi-link operation may be set in reserved of a TWT control field in the link with the initial association. For example, the multi-link operation may be identified in a setting mode. For example, setting to be "1" represents that the multi-link operation needs to be performed. In the example of the disclosure, if the identification bit configured for identifying the multi-link operation in the reserved of the TWT control field in the link with the initial association is set to be "1", unicast and broadcast are not distinguished subsequently, the multi-link TWT data frame in the mode shown in FIG. 3 needs to be added in a way of adding a new information element, so as to identify that the multi-link TWT is generated in the link with the initial association and multi-link TWT negotiation is performed.

In the example of the disclosure, the multi-link TWT data frame needs to be sent for performing multi-link TWT negotiation.

In step S12, the multi-link TWT data frame is sent.

Figure 5:
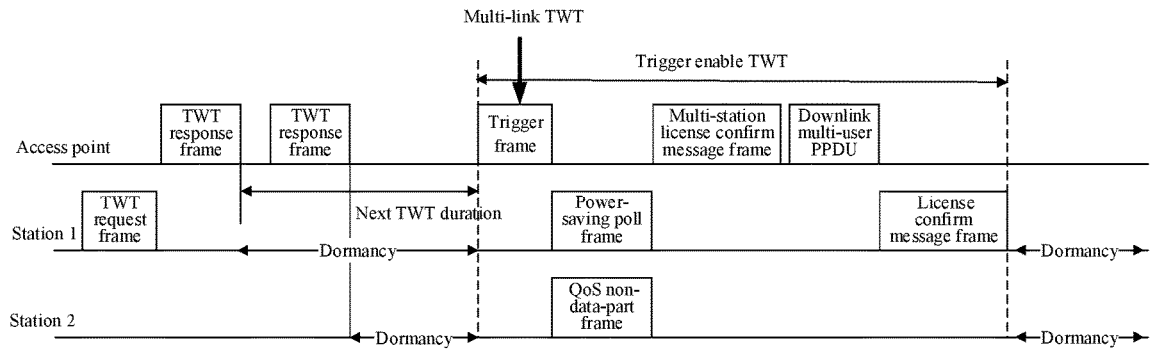
FIG. 5 is a schematic diagram of a process of sending a multi-link TWT data frame based on a trigger frame in a unicast mode to complete multi-link TWT data frame negotiation illustrated according to an example.

On the one hand, the multi-link TWT data frame is sent based on a trigger frame by unicasting through the first link. FIG. 5 is a schematic diagram of a process of sending a multi-link TWT data frame based on a trigger frame in a unicast mode to complete multi-link TWT data frame negotiation illustrated according to an example. As shown in FIG. 5, a station 1 sends a TWT request, and an access point responds to the TWT request sent by the station 1 and carries the multi-link TWT data frame in the trigger frame sent in the next TWT duration. The station 1 carries out polling to obtain the trigger frame carrying the multi-link TWT data frame by utilizing a Power-saving poll frame (PS-Poll), determines a baseline TWT and TWT offsets included in the multi-link TWT data frame and then determines a multi-link TWT to complete multi-link TWT negotiation.

Figure 6:
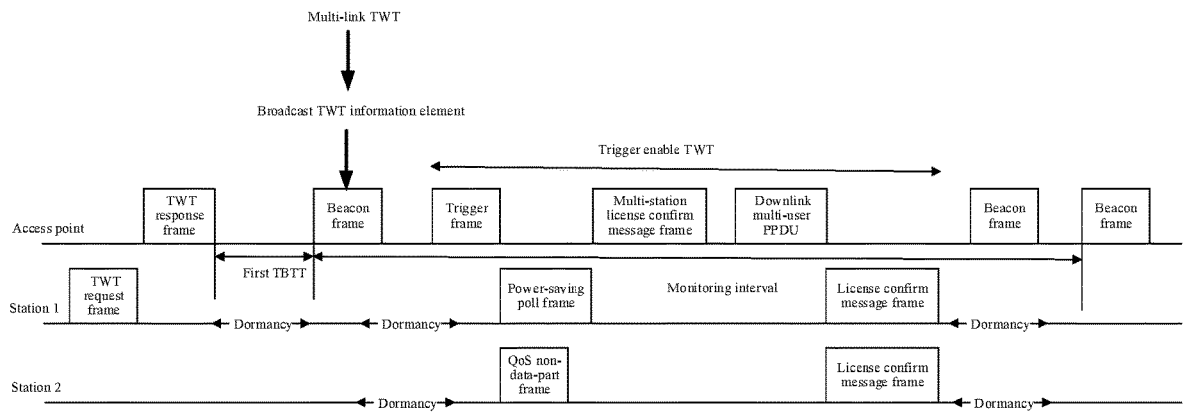
FIG. 6 is a schematic diagram of a process of sending a multi-link TWT data frame based on a beacon frame in a broadcast mode to complete multi-link TWT data frame negotiation illustrated according to an example.

On the other hand, the multi-link TWT data frame is sent based on a beacon frame by broadcasting through the first link. FIG. 6 is a schematic diagram of a process of sending a multi-link TWT data frame based on a beacon frame in a broadcast mode to complete multi-link TWT data frame negotiation illustrated according to an example. As shown in FIG. 6, a station 1 sends a TWT request, and an access point responds to the TWT request sent by the station 1 and broadcasts the beacon frame after the first TBTT. The beacon frame includes a broadcast TWT information element, and the multi-link TWT data frame is carried in broadcast TWT information. The station 1 carries out polling to obtain the beacon frame carrying the multi-link TWT data frame, determines a baseline TWT and TWT offsets included in the multi-link TWT data frame and then determines a multi-link TWT to complete multi-link TWT negotiation.

Figure 7:
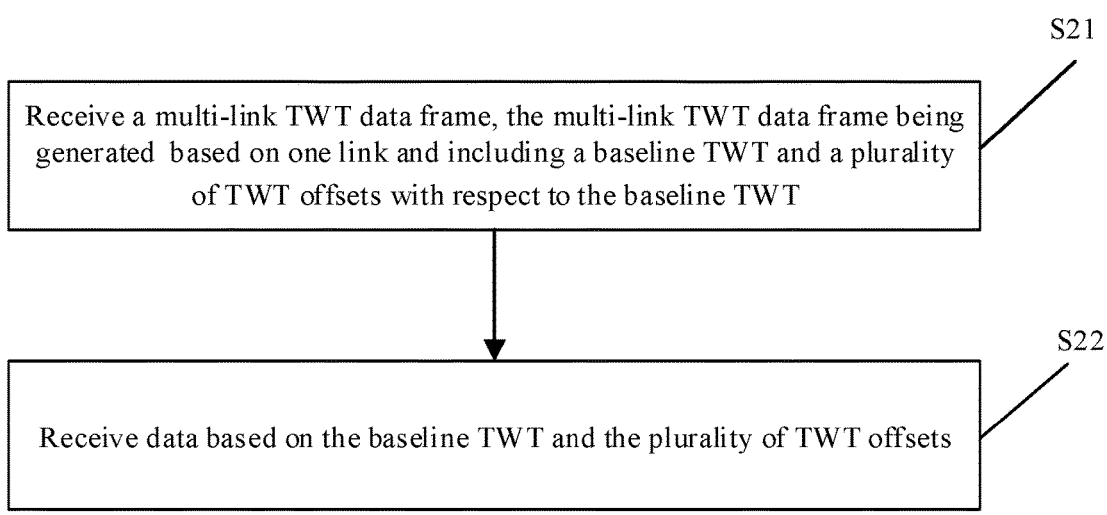
FIG. 7 is a flow diagram of a data transmission method illustrated according to an example.

FIG. 7 is a flow diagram of a data transmission method illustrated according to an example. As shown in FIG. 7, the method includes the following steps.

In step S21, a multi-link TWT data frame is received, the multi-link TWT data frame being generated based on one link and including a baseline TWT and a plurality of TWT offsets with respect to the baseline TWT.

When the multi-link TWT data frame is received, downlink cache data may be received based on each link respectively based on a first link identification and the TWT offsets in the multi-link TWT data frame. In a unicast operation, a station receives a trigger frame broadcast by an access point based on each link, and receives the multi-link TWT data frame based on the trigger frame. On the other hand, in the case of broadcast, the station receives a beacon frame broadcast by the access point based on each link, and receives the multi-link TWT data frame based on the beacon frame.

The multi-link TWT data frame received in the example of the disclosure is the multi-link TWT data frame involved in the above example, which will not be detailed here.

In step S22, data are received based on the baseline TWT and the plurality of TWT offsets.

In the example of the disclosure, after the multi-link TWT data frame is received, a TWT of each link in a plurality of links may be determined based on the baseline TWT and the plurality of TWT offsets included in the multi-link TWT data frame, and after TWT wakeup, downlink cache data are received based on each link respectively.

According to the data transmission method provided by the example of the disclosure, the multi-link TWT data frame is generated based on one link, on the one hand, settings of the multi-link TWT are implemented, and on the other hand, multi-link TWT negotiation is performed in one link to avoid generation of a plurality of pieces of signaling.

The technical solution provided by the example of the disclosure may include the following beneficial effects: in the example of the disclosure, the multi-link TWT data frame is generated based on one link, the multi-link TWT data frame includes the baseline TWT and the plurality of TWT offsets with respect to the baseline TWT, based on the baseline TWT and the plurality of TWT offsets, the TWT for multi-link may be determined, and then settings of the TWT for multi-link are implemented, so that a TWT mechanism is applied to the multi-link, and a device is more power-saving.

Based on the same concept, an example of the disclosure further provides a data transmission apparatus.

It can be understood that the data transmission apparatus provided by the example of the disclosure includes a hardware structure and/or software module corresponding to performing each function in order to achieve the above functions. In combination with units and algorithm steps of each instance disclosed in the example of the disclosure, the example of the disclosure can be implemented in the form of hardware or a combination of hardware and computer software. Whether a function is performed by hardware or computer software driving hardware depends on the specific application and design constraints of the technical solutions. Those skilled in the art can use different methods to implement the described functions for each specific application, but such implementation is not to be considered to be beyond the scope of the technical solutions of the example of the disclosure.

Figure 8:
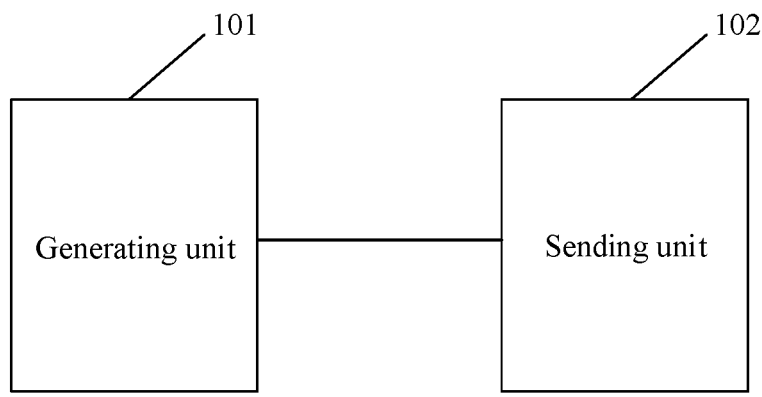
FIG. 8 is a block diagram of a data transmission apparatus illustrated according to an example.

FIG. 8 is a block diagram of a data transmission apparatus illustrated according to an example. Referring to FIG. 8, the data transmission apparatus 100 includes a generating unit 101 and a sending unit 102. The generating unit 101 is configured to generate a multi-link TWT data frame based on one link, the multi-link TWT data frame including a baseline TWT and a plurality of TWT offsets with respect to the baseline TWT. The sending unit 102 is configured to send the multi-link TWT data frame.

In an implementation, the multi-link TWT data frame further includes an identification bit, the identification bit being configured for identifying that the multi-link TWT data frame is a TWT data frame for indicating performing a multi-link operation.

In another implementation, the multi-link TWT data frame further includes a plurality of band identifications, and each of the plurality of band identifications corresponds to a TWT offset of the TWT offsets, respectively.

In yet another implementation, the baseline TWT is determined based on parameter information of a time synchronization function (TSF) of a first link. The first link is one of a plurality of links.

In yet another implementation, the first link is a link establishing an initial association among the plurality of links.

In yet another implementation, the sending unit 102 sends the multi-link TWT data frame based on a trigger frame by unicasting through the first link.

In yet another implementation, the sending unit 102 sends the multi-link TWT data frame based on a beacon frame by broadcasting through the first link.

Figure 9:
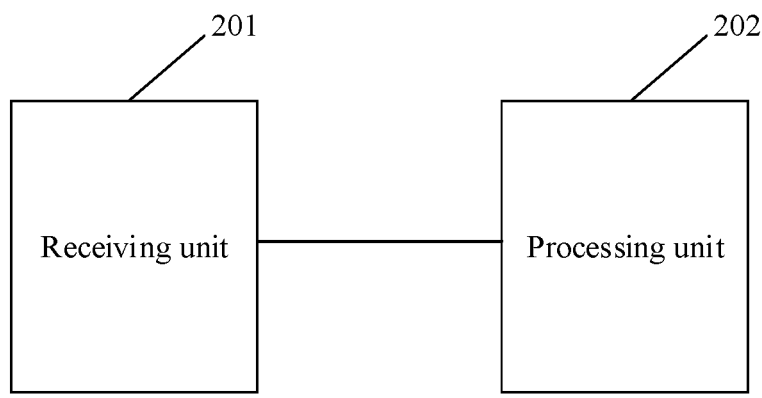
FIG. 9 is a block diagram of a data transmission apparatus illustrated according to an example.

FIG. 9 is a block diagram of a data transmission apparatus illustrated according to an example. Referring to FIG. 9, the data transmission apparatus 200 includes a receiving unit 201 and a processing unit 202. The receiving unit 201 is configured to receive a multi-link TWT data frame, the multi-link TWT data frame including a baseline TWT and a plurality of TWT offsets with respect to the baseline TWT, and receive data based on the baseline TWT and the plurality of TWT offsets. The processing unit 202 is configured to determine the baseline TWT and the plurality of TWT offsets.

In an implementation, the multi-link TWT data frame further includes an identification bit, the identification bit being configured for identifying that the multi-link TWT data frame is a TWT data frame for indicating performing a multi-link operation.

In yet another implementation, the multi-link TWT data frame further includes a plurality of band identifications, and each of the plurality of band identifications corresponds to a TWT offset of the TWT offsets, respectively.

In yet another implementation, the baseline TWT is determined based on parameter information of a time synchronization function (TSF) of a first link. The first link is one of a plurality of links.

In yet another implementation, the first link is a link establishing an initial association among the plurality of links.

In yet another implementation, the receiving unit 201 receives a trigger frame through the first link, and receives the multi-link TWT data frame based on the trigger frame.

In yet another implementation, the receiving unit 201 receives a beacon frame through the first link, and receives the multi-link TWT data frame based on the beacon frame.

As for the apparatus in the above example, the specific manner in which each module performs operations has been described in detail in the example of the method, which will not be described in detail here.

Figure 10:
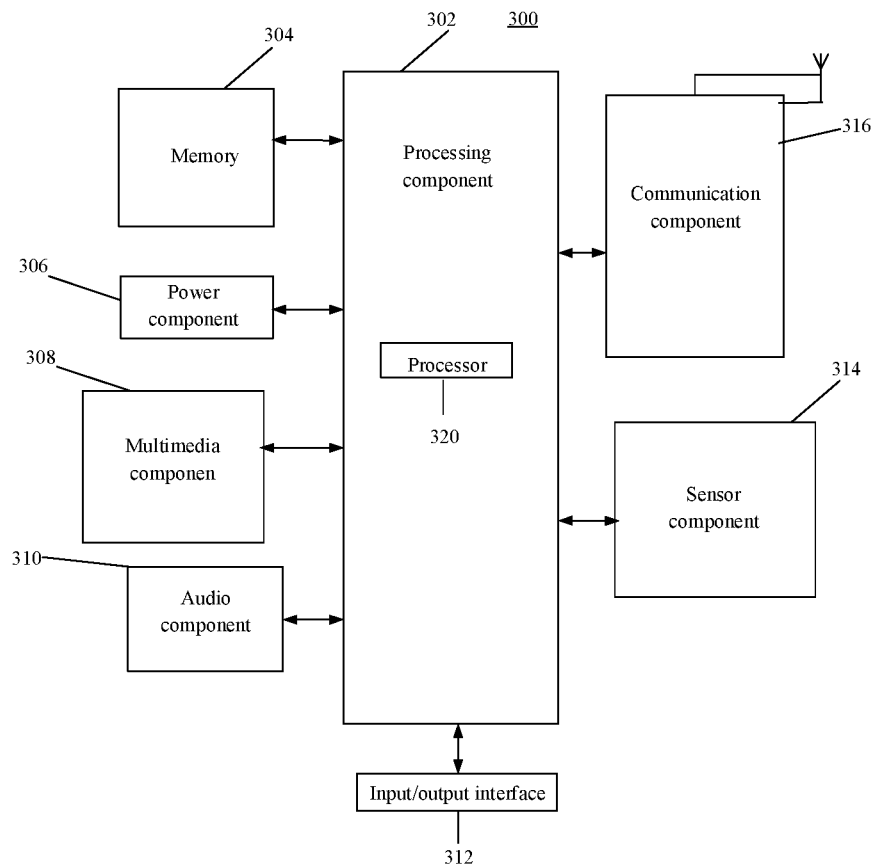
FIG. 10 is a block diagram of an apparatus for data transmission illustrated according to an example.

FIG. 10 is a block diagram of an apparatus 300 for data transmission illustrated according to an example. For example, the apparatus 300 may be a station, such as a mobile phone, a computer, a digital broadcasting terminal, a messaging device, a game console, a tablet device, a medical device, a fitness device, a personal digital assistant, etc. The apparatus 300 may also be an access point.

Referring to FIG. 10, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls the overall operation of the apparatus 300, such as operations associated with display, telephone call, data communication, camera operations, and recording operations. The processing component 302 may include one or more processors 320 to execute instructions to complete all or part of the steps of the above method. In addition, the processing component 302 may include one or more modules to facilitate interaction between the processing component 302 and other components. For example, the processing component 302 may include a multimedia module to facilitate interaction between the multimedia component 308 and the processing component 302.

The memory 304 is configured to store various types of data to support operations at the apparatus 300. Instances of these data include instructions for any application or method operated on the apparatus 300, contact data, phonebook data, messages, pictures, videos, etc. The memory 304 may be implemented by any type of volatile or nonvolatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or optic disk.

The power component 306 provides power for various components of the apparatus 300. The power component 306 may include a power management system, one or more power sources and other components associated with generating, managing and distributing power for the apparatus 300.

The multimedia component 308 includes a screen providing an output interface between the apparatus 300 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor cannot merely sense the boundary of the touch or sliding operation, but also detect the duration and pressure related to the touch or sliding operation. In some examples, the multimedia component 308 includes a front camera and/or a rear camera. When the apparatus 300 is in an operation mode, such as a shooting mode or a video mode, the front camera and/or the rear camera can receive external multimedia data. Each front camera and rear camera can be a fixed optical lens system or have a focal length and optical zoom capability.

The audio component 310 is configured to output and/or input audio signals. For example, the audio component 310 includes a microphone (MIC) configured to receive an external audio signal when the apparatus 300 is in the operation mode, such as a call mode, a recording mode, and a speech recognition mode. The received audio signal may be further stored in the memory 304 or transmitted via the communication component 316. In some examples, the audio component 310 also includes a speaker for outputting the audio signal.

The I/O interface 312 provides an interface between the processing component 302 and a peripheral interface module which can be a keyboard, a click wheel, a button, etc. These buttons may include but are not limited to: a home button, volume buttons, a start button and a lock button.

The sensor component 314 includes one or more sensors for providing state evaluation of various aspects of the apparatus 300. For example, the sensor component 314 can detect an on/off state of the apparatus 300 and the relative positioning of the components, for example, the component is a display and a keypad of the apparatus 300. The sensor component 314 can also detect the change of the position of the apparatus 300 or one component of the apparatus 300, the presence or absence of user contact with the apparatus 300, the azimuth or acceleration/deceleration of the apparatus 300, and temperature change of the apparatus 300. The sensor component 314 may include a proximity sensor configured to detect the presence of nearby objects without any physical contact. The sensor component 314 may further include an optical sensor, such as a CMOS or CCD image sensor, for use in imaging applications. In some examples, the sensor component 314 may further include an acceleration sensor, a gyroscope sensor, a magnetic sensor, a pressure sensor, or a temperature sensor.

The communication component 316 is configured to facilitate wired or wireless communication between the apparatus 300 and other devices. The apparatus 300 may access a wireless network based on a communication standard, such as Wi-Fi, 2G or 3G, or their combination. In an example, the communication component 316 receives a broadcast signal or broadcast-related information from an external broadcast management system via a broadcast channel. In an example, the communication component 316 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the apparatus 300 may be implemented by one or more application-specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the above method.

In an example, a non-transitory computer-readable storage medium including instructions, such as the memory 304 including instructions, which can be executed by the processor 320 of the apparatus 300 to complete the above method, is also provided. For example, the non-transitory computer-readable storage medium may be a ROM, a random access memory (RAM), a CD-ROM, a magnetic tape, a floppy disk, an optical data storage device, etc.

Figure 11:
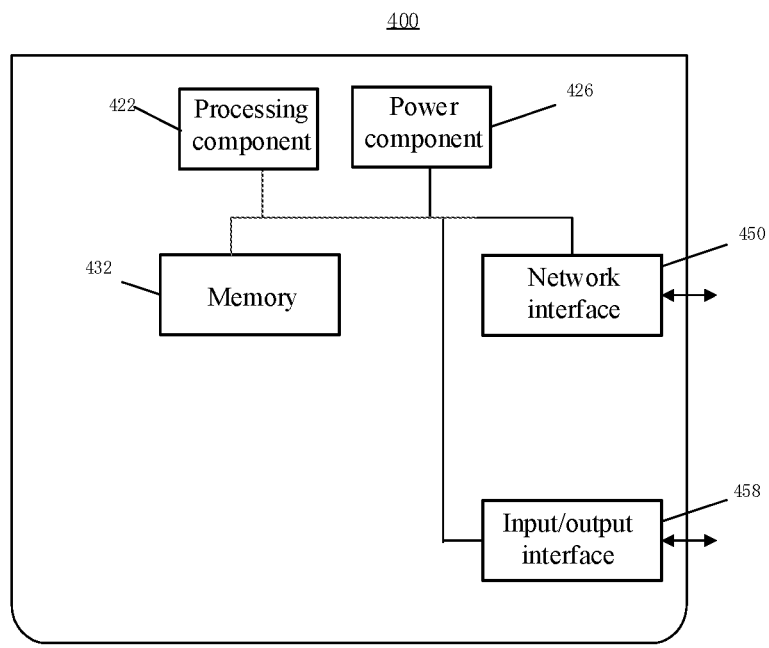
FIG. 11 is a block diagram of an apparatus for data transmission illustrated according to an example.

FIG. 11 is a block diagram of an apparatus 400 for data transmission illustrated according to an example. For example, the apparatus 400 may be provided as a server. Referring to FIG. 4, the apparatus 400 includes a processing component 422, which further includes one or more processors, and a memory resource represented by a memory 432 for storing instructions, such as applications, that can be executed by the processing component 422. The applications stored in the memory 432 may include one or more modules each corresponding to a set of instructions. In addition, the processing component 422 is configured to execute instructions to execute the above method.

The apparatus 400 may further include a power component 426 configured to perform power management of the apparatus 400, a wired or wireless network interface 450 configured to connect the apparatus 400 to the network, and an input/output (I/O) interface 458. The apparatus 400 can operate an operating system based on the memory 432, such as Windows Server™, Mac OS X™, Unix™, Linux™, FreeBSD™, or the like.

In an example, a non-transitory computer-readable storage medium including instructions, such as the memory 432 including instructions, which can be executed by the processor of the apparatus 400 to complete the above method, is also provided. For example, the non-transitory computer-readable storage medium may be a ROM, a random access memory (RAM), a CD-ROM, a magnetic tape, a floppy disk, an optical data storage device, etc.

It can be further understood that "a plurality of" in the disclosure refers to two or more, and other quantifiers are similar. "And/or" describes the association relationship of associated objects, which means that there can be three kinds of relationships, for example, A and/or B can mean that there are three kinds of situations: A alone, A and B at the same time, and B alone. The character "/" universally indicates that the previous and next associated objects are in an "or" relationship. The singular forms "one", "said" and "the" are also intended to include the majority forms unless the context clearly indicates other meanings.

It can be further understood that the terms "first", "second" and the like are used to describe various information, but these information should not be limited to these terms. These terms are used to distinguish the same type of information from each other, and do not indicate a specific order or importance. In fact, the expressions "first" and "second" can be used interchangeably. For example, without departing from the scope of the disclosure, first information may also be referred to as second information, and similarly, the second information may also be referred to as the first information.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

It can be further understood that in the example of the disclosure, although the operations are described in a specific order in the accompanying drawings, it is not to be understood as requiring these operations to be performed in the specific order or serial order shown, or requiring all the operations shown to be performed to achieve the desired results. Multitasking and parallel processing may be advantageous in a particular environment.

Other examples of the disclosure will be apparent to those skilled in the art from consideration of the specification and practice of the disclosure here. The disclosure is intended to cover any variations, uses, or adaptations of the disclosure following the general principles of the disclosure and including such departures from the disclosure as come within known or customary practice in the art. It is intended that the specification and examples be considered as examples.

It will be appreciated that the disclosure is not limited to the exact construction that has been described above and illustrated in the accompanying drawings, and that various modifications and variations may be made without departing from its scope. It is intended that the scope of the disclosure be limited by the appended claims.

What is claimed is:

1. A data transmission method, comprising:
generating, by a terminal, a multi-link target wakeup time (TWT) data frame based on one link, the multi-link TWT data frame comprising a baseline TWT and a plurality of TWT offsets with respect to the baseline TWT, the plurality of TWT offsets correspond to a plurality of bands; and
sending, by the terminal, the multi-link TWT data frame;
wherein the baseline TWT is determined based on parameter information of a time synchronization function (TSF) of a first link; and the first link is one of a plurality of links.

2. The data transmission method according to claim 1, wherein the multi-link TWT data frame further comprises an identification bit, the identification bit being configured for identifying that the multi-link TWT data frame is a TWT data frame for indicating performing a multi-link operation.

3. The data transmission method according to claim 1, wherein the multi-link TWT data frame further comprises a plurality of band identifications, and each of the plurality of band identifications corresponds to a TWT offset of the TWT offsets, respectively.

4. The data transmission method according to claim 1, wherein the first link is a link establishing an initial association among the plurality of links.

5. The data transmission method according to claim 1, wherein sending the multi-link TWT data frame comprises:
sending the multi-link TWT data frame based on a trigger frame by unicasting through the first link.

6. The data transmission method according to claim 1, wherein sending the multi-link TWT data frame comprises:
sending the multi-link TWT data frame based on a beacon frame by broadcasting through the first link.

7. A non-transitory computer-readable storage medium, wherein instructions in the storage medium, when executed by one or more processors of a terminal, cause the terminal to perform the data transmission method according to claim 1.

8. A data transmission method, comprising:
receiving, by a terminal, a multi-link target wakeup time (TWT) data frame, the multi-link TWT data frame being generated based on one link and comprising a baseline TWT and a plurality of TWT offsets with respect to the baseline TWT, the plurality of TWT offsets correspond to a plurality of bands; and
receiving, by the terminal, data based on the baseline TWT and the plurality of TWT offsets;
wherein the baseline TWT is determined based on parameter information of a time synchronization function (TSF) of a first link; and the first link is one of a plurality of links.

9. The data transmission method according to claim 8, wherein the multi-link TWT data frame further comprises an identification bit, the identification bit being configured for identifying that the multi-link TWT data frame is a TWT data frame for indicating performing a multi-link operation.

10. The data transmission method according to claim 8, wherein the multi-link TWT data frame further comprises a plurality of band identifications, and each of the plurality of band identifications corresponds to a TWT offset of the TWT offsets, respectively.

11. The data transmission method according to claim 8, wherein the first link is a link establishing an initial association among the plurality of links.

12. The data transmission method according to claim 8, wherein receiving the multi-link TWT data frame comprises:
receiving a trigger frame through the first link, and receiving the multi-link TWT data frame based on the trigger frame.

13. The data transmission method according to claim 8, wherein receiving multi-link the TWT data frame comprises:

receiving a beacon frame through the first link, and receiving the multi-link TWT data frame based on the beacon frame.

14. A data transmission apparatus, comprising:
one or more processors; and
a memory, configured to store processor-executable instructions; wherein
the one or more processors are configured to: execute the data transmission method according to claim 8.

15. A non-transitory computer-readable storage medium, wherein instructions in the storage medium, when executed by one or more processors of a terminal, cause the terminal to perform the data transmission method according to claim 8.

16. A data transmission apparatus, comprising:
one or more processors; and
a memory, configured to store processor-executable instructions; wherein
the one or more processors are configured to:

generate a multi-link target wakeup time (TWT) data frame based on one link, the multi-link TWT data frame comprising a baseline TWT and a plurality of TWT offsets with respect to the baseline TWT, the plurality of TWT offsets correspond to a plurality of bands; and
send the multi-link TWT data frame;
wherein the baseline TWT is determined based on parameter information of a time synchronization function (TSF) of a first link; and the first link is one of a plurality of links.

17. The data transmission apparatus according to claim 16, wherein the first link is a link establishing an initial association among the plurality of links.

18. The data transmission apparatus according to claim 16, the one or more processors are configured to: send the multi-link TWT data frame based on a trigger frame by unicasting through the first link; or
send the multi-link TWT data frame based on a beacon frame by broadcasting through the first link.

* * * * *